(12) United States Patent
Krell et al.

(10) Patent No.: US 7,674,304 B2
(45) Date of Patent: Mar. 9, 2010

(54) DRIFT ELIMINATOR WITH FORMED BEVELED TIP

(75) Inventors: Timothy E. Krell, Mohrsville, PA (US); Andrew L. Truex, Shillington, PA (US)

(73) Assignee: Brentwood Industries, Inc., Reading, PA (US)

(*) Notice: Subject to any disclaimer, the term of this patent is extended or adjusted under 35 U.S.C. 154(b) by 0 days.

(21) Appl. No.: 12/146,824

(22) Filed: Jun. 26, 2008

(65) Prior Publication Data

US 2009/0320689 A1    Dec. 31, 2009

(51) Int. Cl.
*B01D 45/00* (2006.01)
(52) U.S. Cl. .............................. 55/440; 55/441; 55/442; 55/443; 55/444; 55/445; 55/464; 55/465; 55/434; 454/282; 454/905; 96/356; 96/358; 261/112.2; 261/DIG. 11
(58) Field of Classification Search ........... 55/342–343, 55/440–445, 464–465, 434; 261/112.2, DIG. 11; 96/356, 358; 454/282, 905

See application file for complete search history.

(56) References Cited

U.S. PATENT DOCUMENTS

| | | | | |
|---|---|---|---|---|
| 1,898,591 A | * | 2/1933 | Mohler et al. .............. 261/103 |
| 2,124,290 A | * | 7/1938 | Fleisher ..................... 261/115 |
| 2,276,277 A | * | 3/1942 | Waters ......................... 96/189 |
| 2,400,623 A | * | 5/1946 | Baird et al. ................... 55/440 |
| 2,554,428 A | * | 5/1951 | Swearingen .............. 261/36.1 |
| 2,752,005 A | * | 6/1956 | Avera et al. ................... 55/436 |
| 2,760,597 A | * | 8/1956 | Brixius ........................ 55/440 |
| 2,796,145 A | * | 6/1957 | King ............................ 96/262 |
| 2,837,171 A | * | 6/1958 | Kocher ........................ 55/440 |
| 2,873,816 A | * | 2/1959 | Umbricht et al. ............. 96/265 |
| 2,899,183 A | * | 8/1959 | Umbricht ..................... 261/24 |
| 3,116,989 A | * | 1/1964 | Warren ........................ 96/356 |
| 3,132,190 A | * | 5/1964 | Engalitcheff, Jr. ............ 261/30 |
| 3,304,696 A | * | 2/1967 | McKenna ................... 96/126 |
| 3,315,445 A | * | 4/1967 | De Seversky ................ 96/53 |
| 3,444,670 A | * | 5/1969 | Hungate ...................... 96/356 |
| 3,527,030 A | * | 9/1970 | Hungate ...................... 55/440 |
| 3,557,535 A | * | 1/1971 | Howick ....................... 96/316 |
| 3,748,832 A | * | 7/1973 | Furlong et al. ............... 96/356 |
| 3,785,127 A | * | 1/1974 | Mare .......................... 96/297 |
| 3,802,158 A | * | 4/1974 | Ohle ............................ 96/53 |
| 3,811,252 A | * | 5/1974 | Evans et al. .................. 96/237 |
| 3,853,514 A | * | 12/1974 | Post ............................ 96/230 |
| 3,870,488 A | * | 3/1975 | Arndt et al. ................... 55/440 |

(Continued)

*Primary Examiner*—Jason M Greene
*Assistant Examiner*—Dung Bui
(74) *Attorney, Agent, or Firm*—Miller Law Group, PLLC

(57) ABSTRACT

A drift eliminator is formed from alternating curved spacers and corrugated spacer members to define tube-like passageways for the flow of air through an evaporative cooling apparatus. The formation of the corrugated blade member with beveled side walls places the back walls of the channels in a different plane than the front walls, with the lower edge of the front walls of the channels being positioned in a common plane along with the lower edge of the blade members. The angled side walls impede the formation of a film of water across the inlet opening into the channel, which requires an increase in horsepower for the fan to push air through the drift eliminator. Mechanical fastening devices molded into the respective members connects the corrugated spacer members and the blade members. A method of forming the corrugated spacer members to provide the angled side walls is also provided.

16 Claims, 15 Drawing Sheets

U.S. PATENT DOCUMENTS

| | | | | |
|---|---|---|---|---|
| 3,912,471 A * | 10/1975 | Cotton, Jr. | | 55/440 |
| 3,922,153 A * | 11/1975 | Engalitcheff et al. | | 96/356 |
| 3,982,914 A * | 9/1976 | Grimble | | 96/356 |
| 4,014,669 A * | 3/1977 | Thompson et al. | | 96/356 |
| 4,040,824 A * | 8/1977 | Kinney, Jr. | | 95/267 |
| 4,045,193 A * | 8/1977 | Halliday | | 96/356 |
| 4,072,478 A * | 2/1978 | Regehr et al. | | 55/440 |
| 4,157,250 A * | 6/1979 | Regehr et al. | | 96/299 |
| 4,178,160 A * | 12/1979 | Rahman | | 55/436 |
| 4,204,847 A * | 5/1980 | Ko | | 96/356 |
| 4,225,188 A * | 9/1980 | McGuire et al. | | 299/64 |
| 4,251,242 A * | 2/1981 | Ito | | 96/232 |
| 4,264,411 A * | 4/1981 | Almond, Jr. | | 159/1.1 |
| 4,322,234 A * | 3/1982 | Mock | | 55/440 |
| 4,333,749 A * | 6/1982 | Holmberg et al. | | 96/356 |
| 4,361,426 A * | 11/1982 | Carter et al. | | 96/299 |
| 4,430,101 A * | 2/1984 | Sixsmith | | 55/440 |
| 4,500,330 A | 2/1985 | Bradley | | 55/440 |
| 4,508,552 A * | 4/1985 | Ovard | | 55/440 |
| 4,514,202 A * | 4/1985 | Kinney et al. | | 55/440 |
| 4,530,707 A * | 7/1985 | Ovard | | 55/440 |
| 4,543,108 A * | 9/1985 | Wurz | | 95/272 |
| 4,553,993 A * | 11/1985 | Wigley | | 55/440 |
| 4,557,740 A * | 12/1985 | Smith | | 55/440 |
| 4,601,731 A * | 7/1986 | Michelson | | 95/272 |
| 4,784,674 A * | 11/1988 | Sarmiento et al. | | 95/272 |
| 4,919,696 A * | 4/1990 | Higashi et al. | | 55/434.4 |
| 4,954,148 A * | 9/1990 | Alexander, Sr. | | 96/277 |
| 5,112,375 A * | 5/1992 | Brown | | 55/440 |
| 5,178,654 A * | 1/1993 | Cowley et al. | | 96/356 |
| 5,203,894 A * | 4/1993 | Chowaniec | | 55/440 |
| 5,230,725 A * | 7/1993 | Chowaniec | | 55/440 |
| 5,268,011 A * | 12/1993 | Wurz | | 55/440 |
| 5,269,823 A * | 12/1993 | Wurz | | 55/440 |
| 5,296,009 A * | 3/1994 | Duke | | 55/440 |
| 5,312,464 A * | 5/1994 | Gay | | 96/356 |
| 5,464,459 A * | 11/1995 | VanBuskirk et al. | | 96/356 |
| 6,083,302 A * | 7/2000 | Bauver et al. | | 95/216 |
| 6,260,830 B1 * | 7/2001 | Harrison et al. | | 261/112.2 |
| 6,315,804 B1 | 11/2001 | Bradley | | 55/440 |
| 6,770,121 B1 * | 8/2004 | Sindel | | 95/267 |
| 7,105,036 B2 | 9/2006 | Shepherd | | 55/343 |
| 7,318,855 B2 * | 1/2008 | Newman et al. | | 95/262 |
| 7,424,999 B2 * | 9/2008 | Xu et al. | | 261/97 |
| 2004/0007132 A1 * | 1/2004 | Holmes et al. | | 95/272 |
| 2007/0137482 A1 * | 6/2007 | Xu et al. | | 95/198 |

* cited by examiner

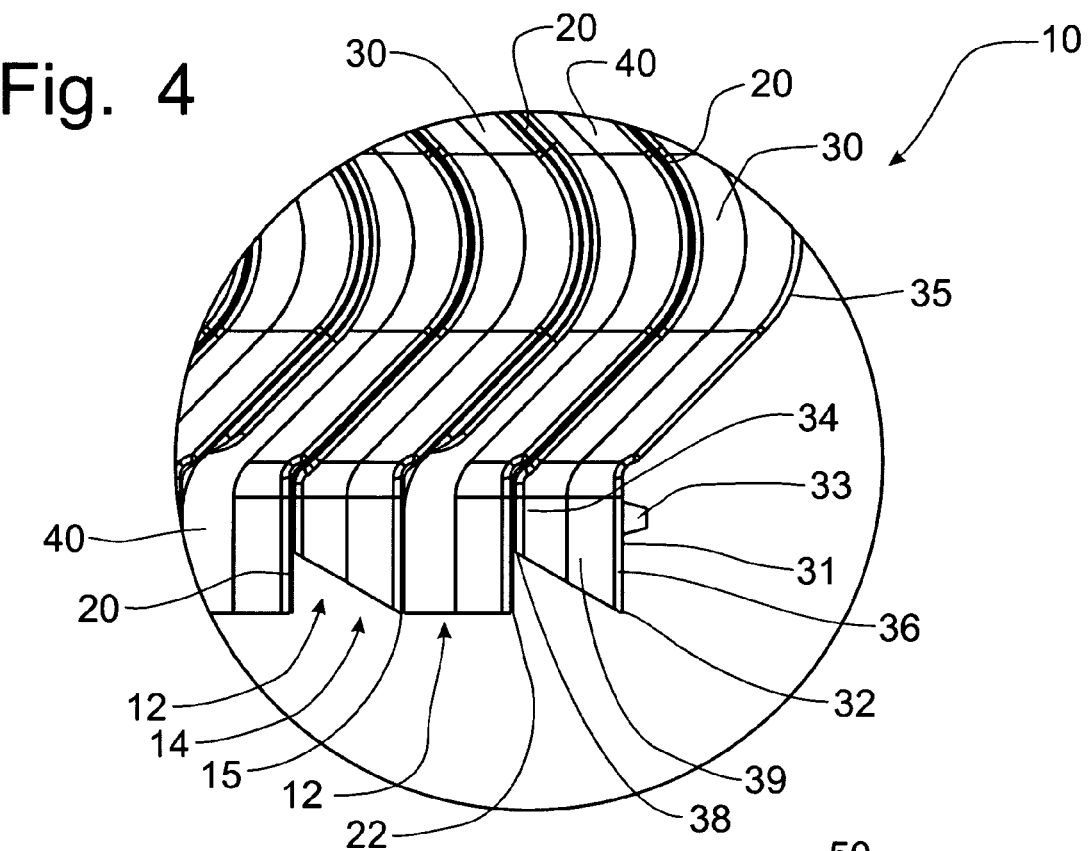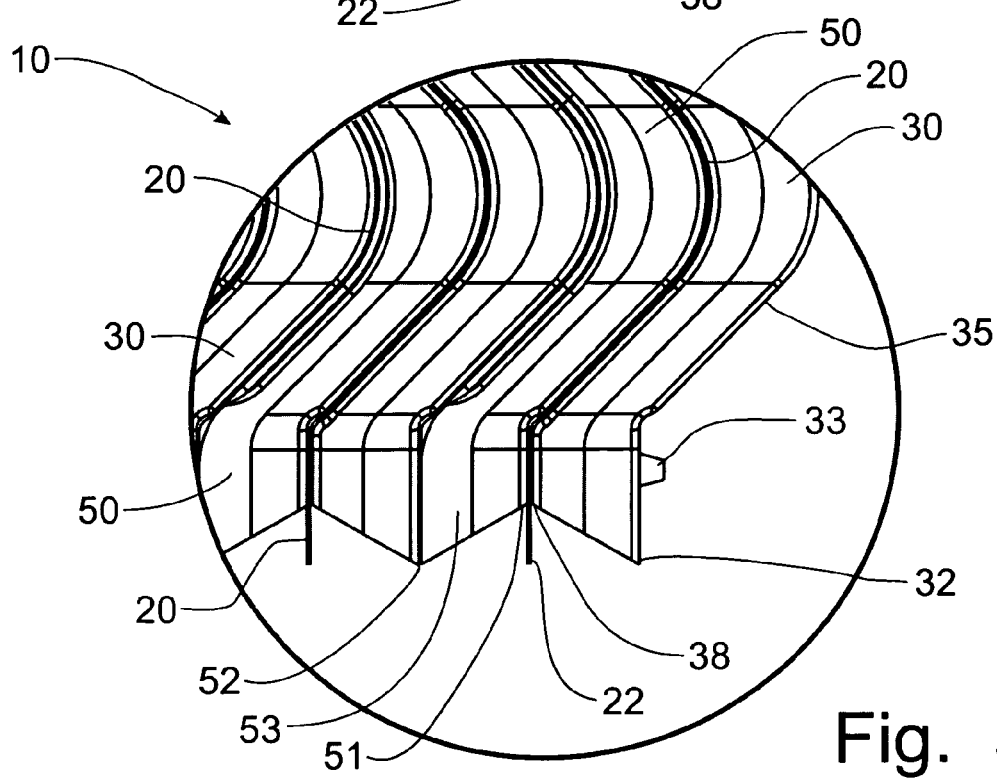

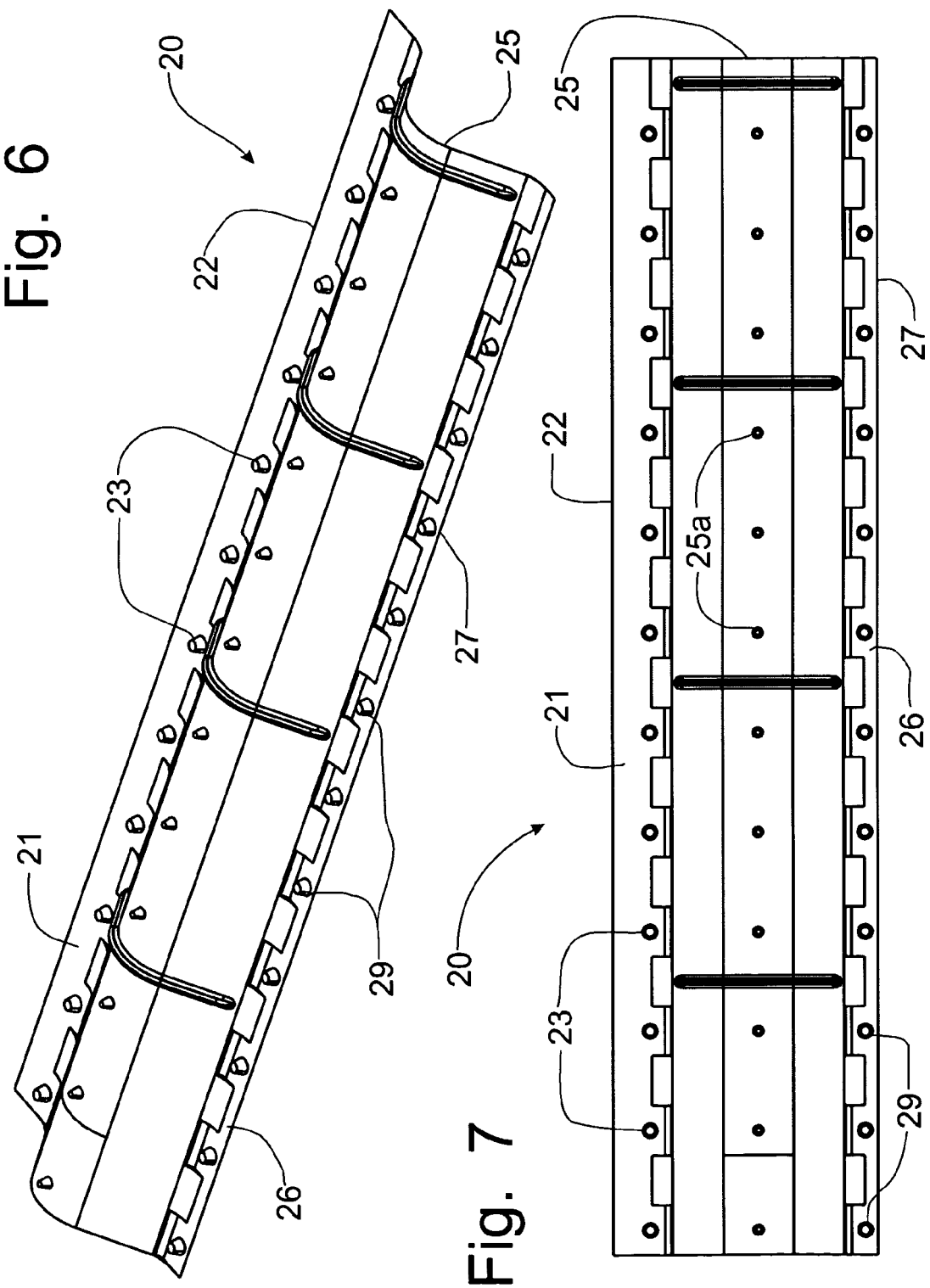

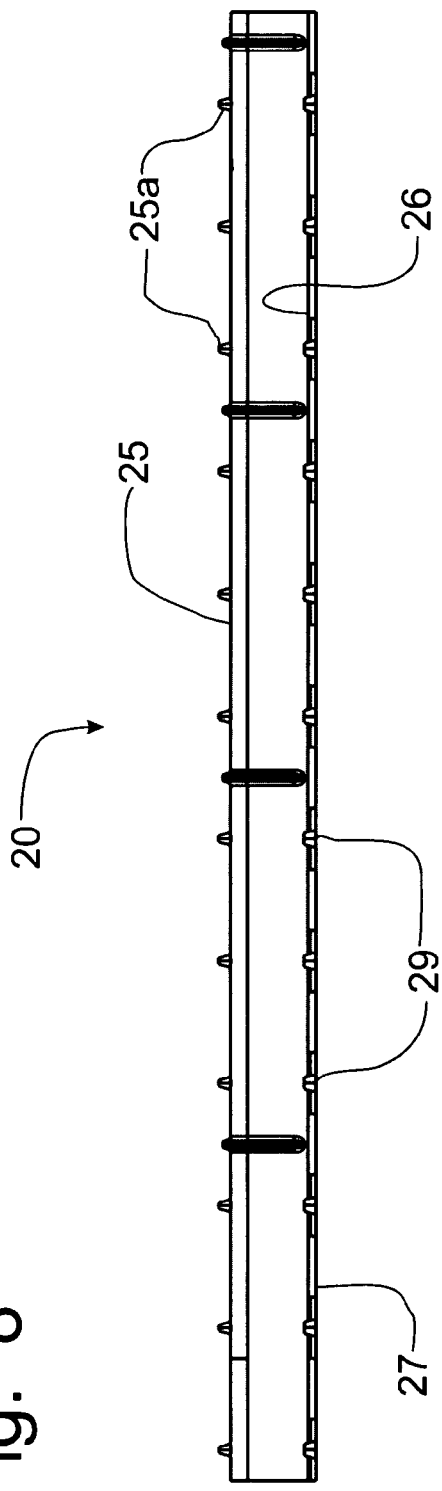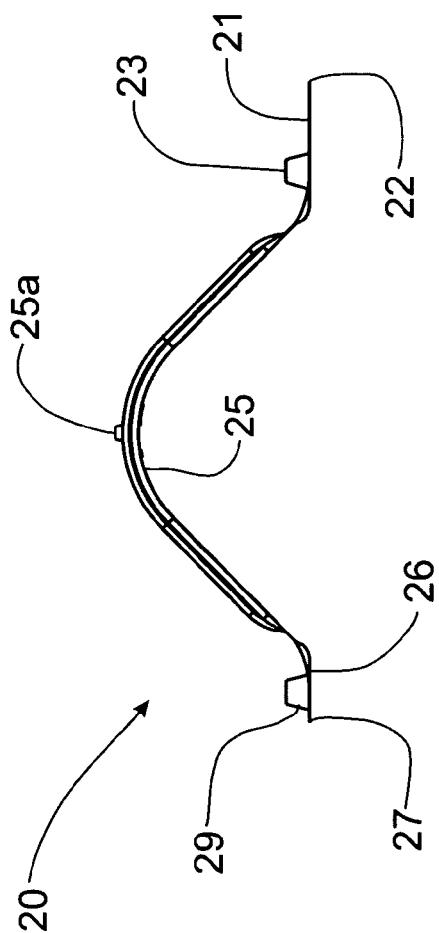

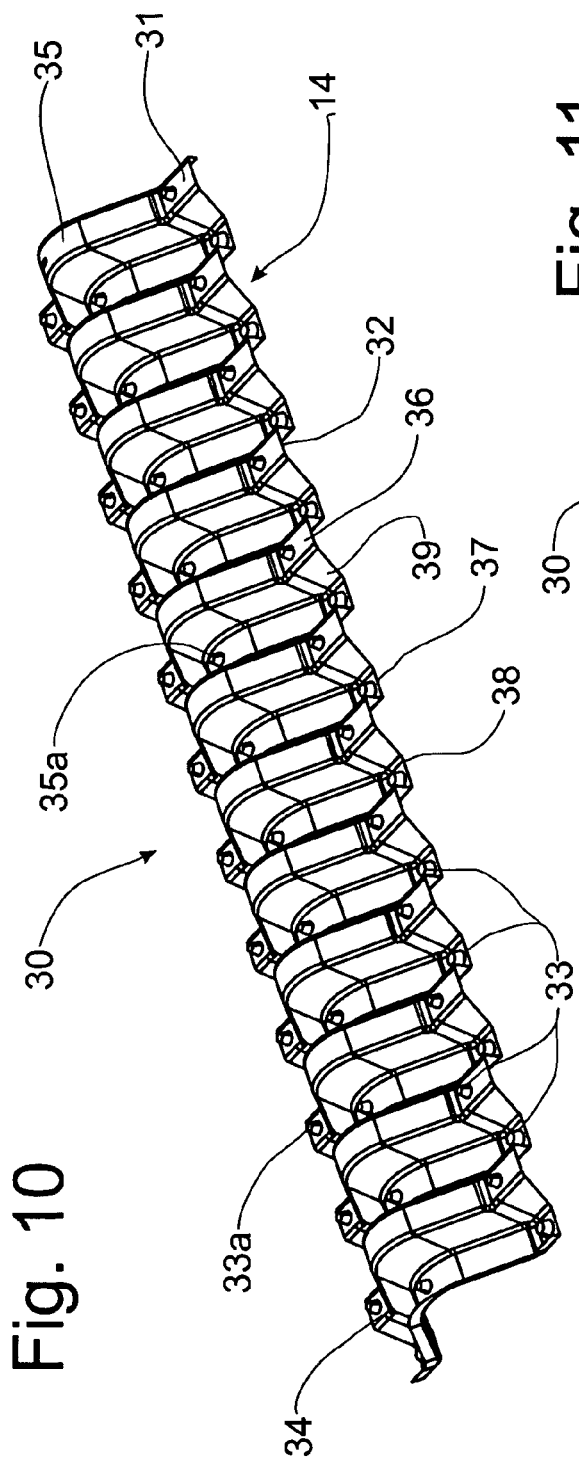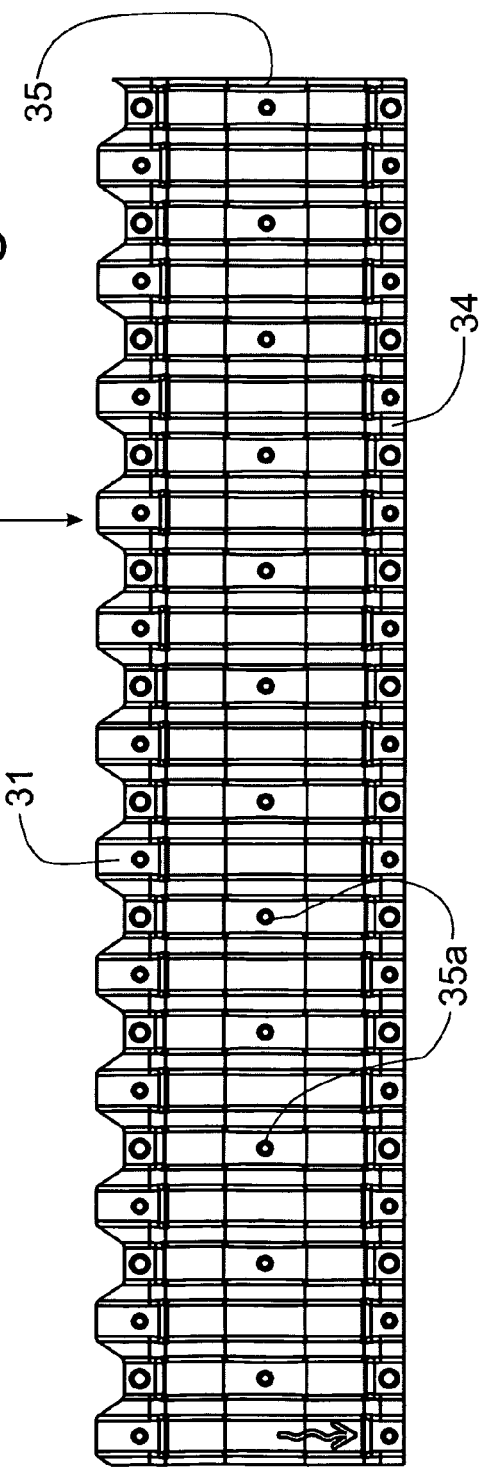

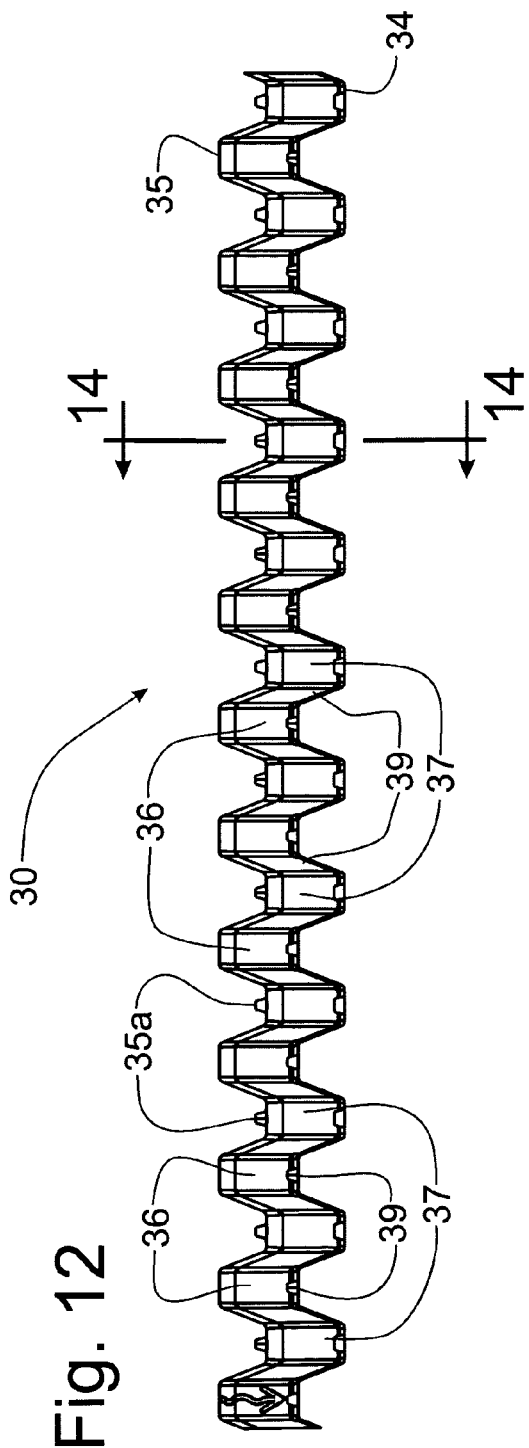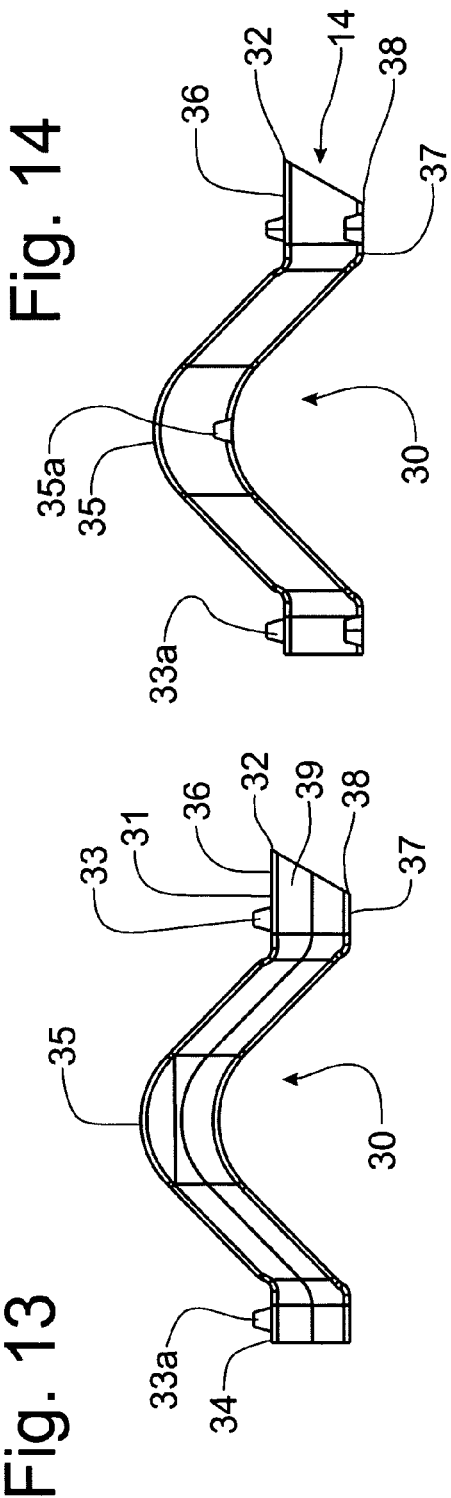

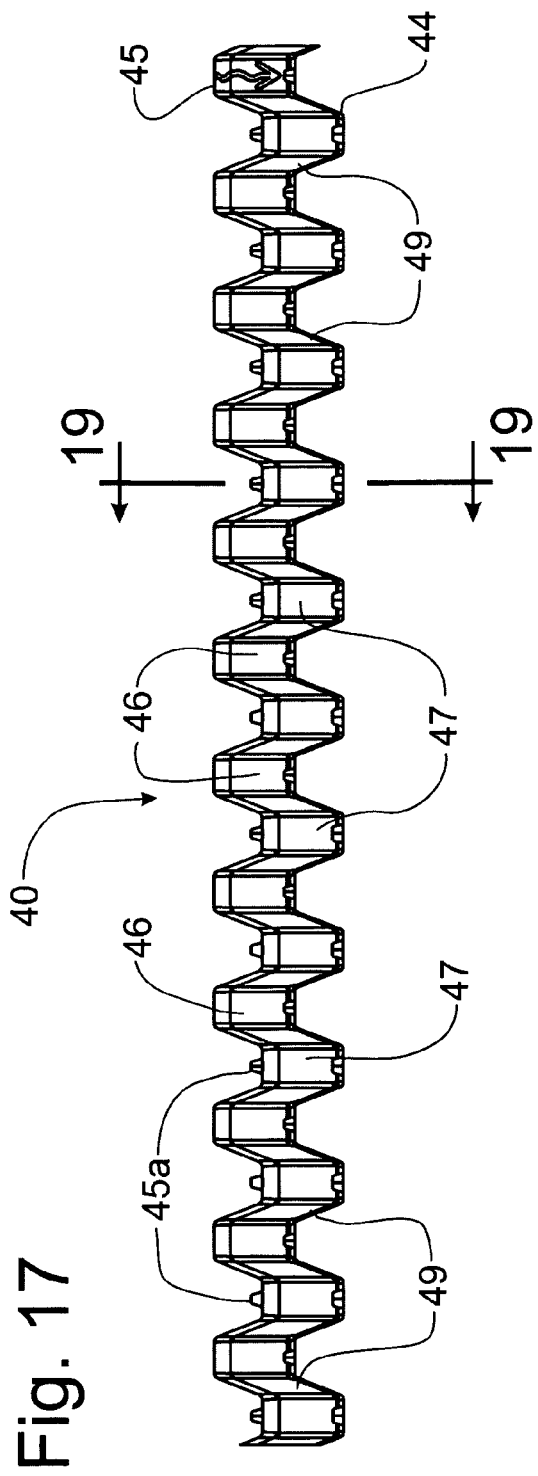
Fig. 17
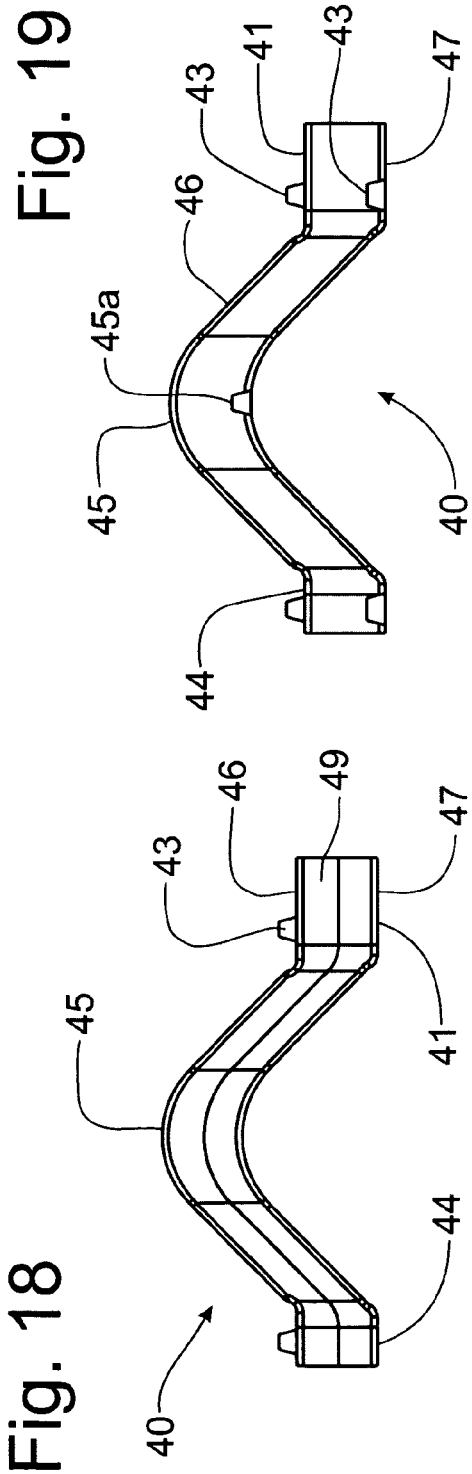
Fig. 18
Fig. 19

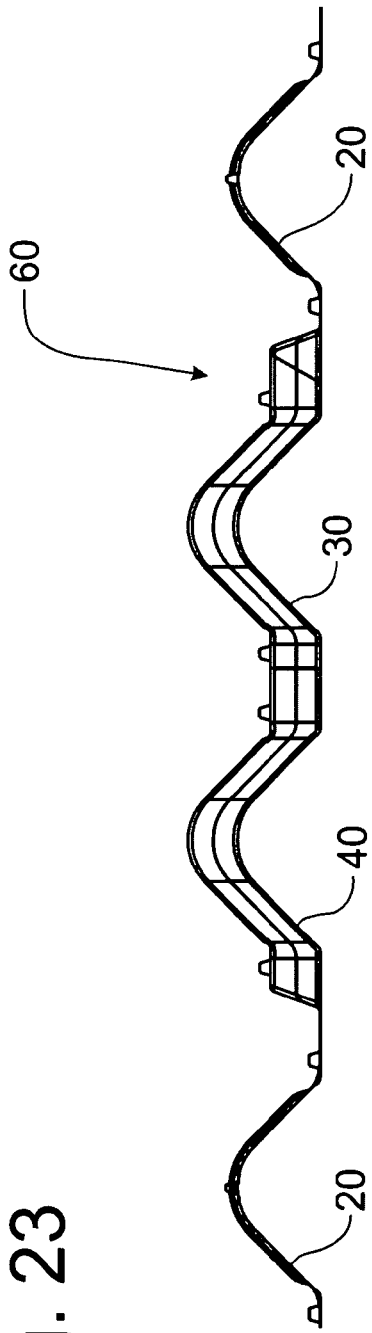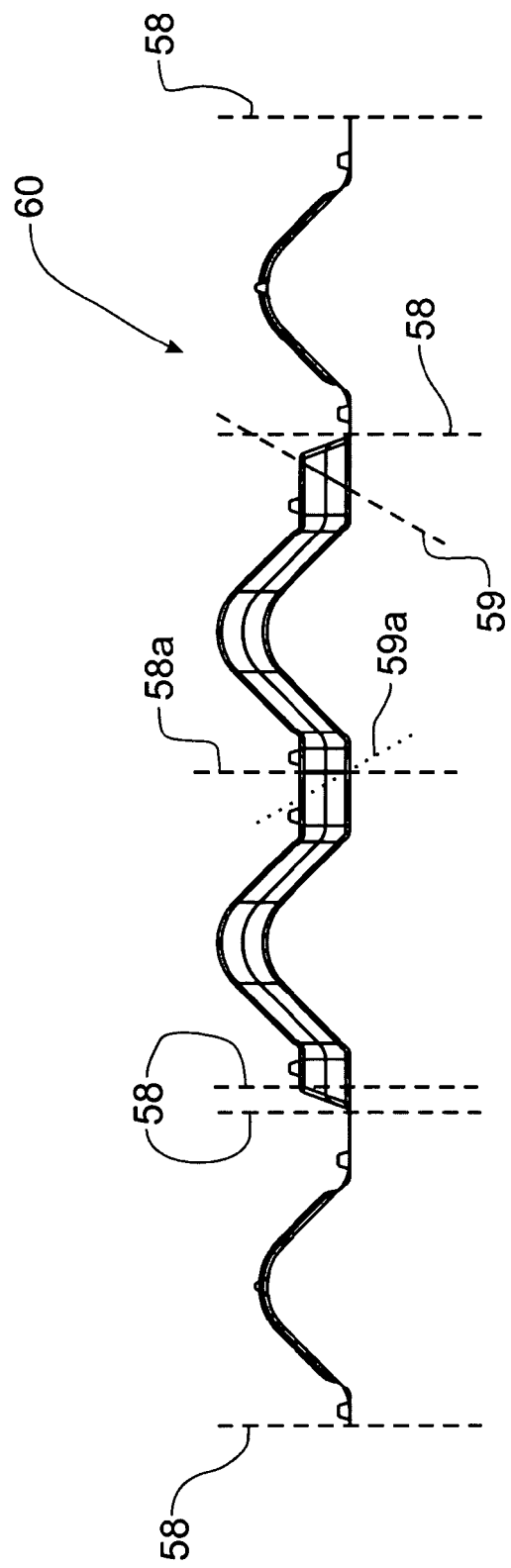

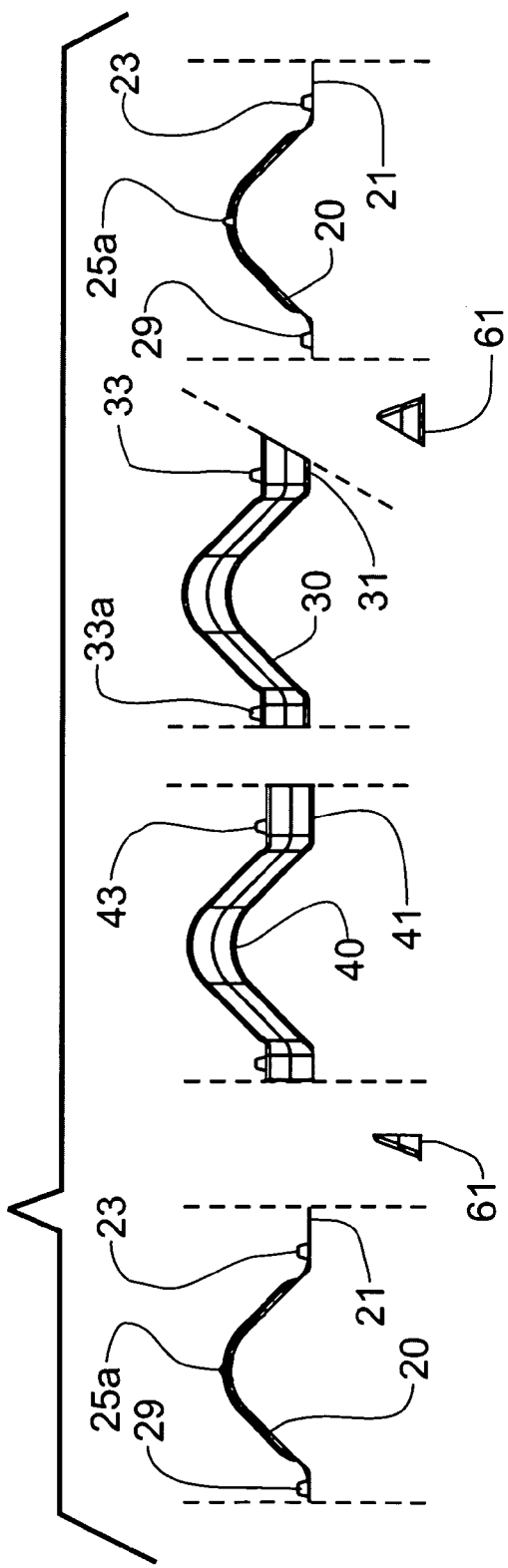
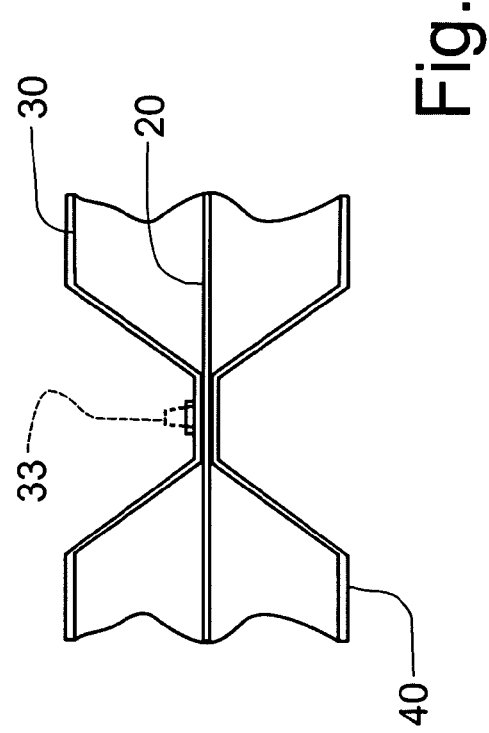

DRIFT ELIMINATOR WITH FORMED BEVELED TIP

FIELD OF THE INVENTION

The present invention generally relates to a drift eliminator used in counter-flow cooling towers and other evaporative cooling devices to remove moisture from the flow of air through the drift eliminator and, more particularly, to a configuration of a drift eliminator that has a formed bevel tip to enhance drainage of accumulated water from blocking the air flow channels through the drift eliminator.

BACKGROUND OF THE INVENTION

A drift eliminator has the function of removing water droplets, entrained typically as a mist which is referred to as "drift", from the flow of air moving through the drift eliminator. The drift eliminator is utilized in evaporative cooling devices, such as cooling towers, to reduce the water volume within the air flow being discharged from the cooling device so that the circulating water is not lost from the evaporative cooling device. By retaining the circulating water within the evaporative cooling equipment, the drift eliminator allows the evaporative cooling device to retain most of the circulating water, as well as the water treatment chemicals within the circulating water.

Drift eliminators are normally formed as a stack of shaped or formed members that cause the air flow moving through the drift eliminator to travel along a curved path. The curved path creates changes in direction for the air flow that result in the water droplets being removed from the air flow. The water droplets will impact the curved walls of the drift eliminator and flow by gravity to the lower end of the drift eliminator stack and be discharged into the circulating water of the evaporative cooling device. Some water droplets continue within the air flow and are discharged from the drift eliminator, and ultimately from the cooling device.

"Drift rate" relates to the amount of water droplets that are carried out of the tower with the air. Drift rate is quantitatively measurable and is commonly expressed as a percentage of the circulating water flow in a tower. A critical performance criterion for drift eliminators is the velocity of the air flow moving through the drift eliminator. If the air velocity exceeds the rate for which the drift eliminator is designed to operate, the drift rate increases causing the drift eliminator to fail by exceeding the specified drift rate, i.e. allowing excessive drift to be discharged from the evaporative cooling device. The maximum operable air velocity rate is a function of the geometry of the drift eliminator, the proximity of the eliminator to the tower's water distribution system, the circulating water flow inside the tower and other factors.

Generally, conventional drift eliminators can be formed in a parallel blade configuration or in a cellular configuration. Parallel blade drift eliminators are constructed from a number of parallel curved blades separated by discrete spacers, which may be separate items or integrally formed in the blade. Cellular drift eliminators are formed from a number of curved blades separated by corrugated spacers that form tube-like cells through which the moisture-laden air flow moves. The parallel curved surfaces created from the stacked blades and corrugated spacers define impingement surfaces to separate water droplets out of the air flow. The tubular design of the cellular drift eliminator configuration adds strength to the stacked assembly. Cellular drift eliminators typically have a higher drift removal efficiency than parallel blade eliminators, but at a slightly higher pressure drop and thus require more power for a fan to move air through the drift eliminator.

Cellular drift eliminators are normally flat on the top and bottom with the walls of the cellular tubes terminating in a generally common horizontally extending plane. The cellular configuration provides increased strength over the parallel blade configuration. As is identified in U.S. Pat. No. 6,315,804, issued to Randall Bradley on Nov. 13, 2001, the planar configuration at the lower ends of the cellular tubes subject the tubes to being breached across the opening of the cellular tube by a film of water from the water droplets falling along the walls of the cellular tubes. The surface tension of these water blockages is sufficient to require an increase in power to move the air flow through the drift eliminator. One solution to this problem is disclosed in aforementioned U.S. Pat. No. 6,315,804, which is to cut a notch into the side wall of the cellular tubes so that water droplets cannot film across a horizontally planar opening.

A drift eliminator formed from curved blades that are stacked and glued together is disclosed in U.S. Pat. No. 4,500,330, granted to Wilson Bradley, Jr. on Feb. 19, 1985. In this patent, the drift eliminator blades are formed from suitable polymeric material, such as polyvinylchloride (PVC), into which is formed impact members to assist in the removal of water droplets from the air flow through the drift eliminator. In U.S. Pat. No. 7,105,036, granted on Sep. 12, 2006, to Gregory Shepherd, a drift eliminator is formed from a plurality of corrugated blade members in a stacked configuration to define cellular tubes for the movement of air through the drift eliminator. The corrugated blades are stacked in a manner to place troughs together so that the troughs can be bonded together by glue or other appropriate adhesive to form the cellular passageways.

The approach taken in aforementioned U.S. Pat. No. 6,315,804 requires the formation of the polymeric corrugated blade member, which can be formed through a thermoforming process in which a flat sheet of PVC film is heated and vacuum formed into the corrugated structure disclosed therein. A subsequent manufacturing step is then required to cut the arch or notch into the side wall of the blade corrugations. In this manner, the notch in the side wall will prevent the formation of the film of water over the inlet portion of the cellular tube, while maintaining a planar surface for support of the drift eliminator.

It would be desirable to provide a blade configuration that will prevent the formation of a film of water across the inlet opening of the cellular tube passageways for the flow of moisture laden air through the drift eliminator without diminishing the strength of the stacked structure.

SUMMARY OF THE INVENTION

It is an object of this invention to overcome the disadvantages of the prior art by providing a drift eliminator that is formed from curved blades separated by corrugated spacers that define cellular tube-like passageways through the drift eliminator for the extraction of water droplets from the air flow through the drift eliminator.

It is an object of this invention to provide a corrugated spacer member for use in constructing a drift eliminator in which the corrugated spacer member is fabricated with beveled side walls.

It is a feature of this invention that the beveled side walls are fabricated only at the air inlet end of the drift eliminator stack.

It is an advantage of this invention that the beveled side walls are located at the lower end of the drift eliminator assembly where water droplets are discharged from the drift eliminator.

It is another advantage of this invention that the beveled side walls prevent water droplets from forming a film over the air inlet of the corresponding tube-like passageway.

It is another feature of this invention that the back wall of a corrugated blade member does not terminate in the plane defined by the edges of the front walls of the stacked corrugated spacer members.

It is still another feature of this invention that the back walls of each corrugated spacer member are attached to a blade member.

It is still another advantage of this invention that blade members have a lower terminus edge that is positioned in the same plane as the edges of the front walls of the corrugated spacer members in the drift eliminator assembly.

It is still another object of this invention to form the beveled side walls of the corrugated spacer members by cutting one end of the corrugated spacer member with an angled knife.

It is still another feature of this invention that the corrugated spacer member is thermoformed from a sheet of PVC material at the same time as other corrugated spacer members and blade members, which members are separated by cutting the PVC material with a knife after being molded.

It is yet another advantage of this invention that the structural strength of the drift eliminator assembly is maintained within acceptable parameters even though the back walls of the corrugated spacer members are not in the same horizontal plane as the lower edges of the front walls of the corrugated spacer members in the drift eliminator stack.

It is yet another feature of this invention that the corrugated spacer members and the blade members can be joined though mechanical fastening devices or by an application of adhesives.

It is still another advantage of this invention that the power requirements for moving air through the drift eliminator are not increased because of the formation of films of water over the air inlet openings into the cellular tube-like passageways through the drift eliminator.

It is a further advantage of this invention that the formation of a beveled side wall structure on the corrugated spacer member does not require a separate manufacturing step after the corrugated spacer member has been vacuumed formed and separated from the other components formed at the same time as the corrugated spacer member.

It is a further object of this invention to provide a drift eliminator assembly formed from alternating curved blade members and corrugated spacer members in which the lower edges of front and back walls of the corrugated member do not define a horizontal plane which is durable in construction, inexpensive of manufacture, carefree of maintenance, facile in assemblage, and simple and effective in use.

It is still a further object of this invention to provide a method of forming a corrugated spacer member for use in conjunction with curved blade members defining cellular tube-like passageways for the removal of water from the air passing through a drift eliminator assembly, which method is durable in construction, inexpensive of manufacture, carefree of maintenance, facile in assemblage, and simple and effective in use.

These and other objects, features and advantages are accomplished according to the instant invention by providing a drift eliminator formed from alternating curved spacers and corrugated spacer members to define tube-like passageways for the flow of air through the evaporative cooling apparatus. The formation of the corrugated blade member with beveled side walls places the back walls of the channels in a different plane than the front walls, with the lower edge of the front walls of the channels being positioned in a common plane along with the lower edge of the blade members. The angled side walls impede the formation of a film of water across the inlet opening into the channel, which requires an increase in power for the fan to move air through the drift eliminator. Mechanical fastening devices molded into the respective members connects the corrugated spacer members and the blade members. A method of forming the corrugated spacer members to provide the angled side walls is also provided.

BRIEF DESCRIPTION OF THE DRAWINGS

The advantages of this invention will be apparent upon consideration of the following detailed disclosure of the invention, especially when taken in conjunction with the accompanying drawings wherein:

FIG. 4 is an enlarged detail view of a portion of the side of the drift eliminator assembly corresponding to circle 4 of FIG. 2 to show a first embodiment of the beveled tip for the lower surface of the drift eliminator assembly;

FIG. 5 is an enlarged detail view of a portion of the side of the drift eliminator assembly corresponding to circle 4 of FIG. 2 to show a second embodiment of the beveled tip for the lower surface of the drift eliminator assembly;

FIG. 6 is a perspective view of a blade member incorporating the principals of the instant invention;

FIG. 7 is a top plan view of the blade member shown in FIG. 6;

FIG. 8 is a front elevational view of the blade member shown in FIG. 7;

FIG. 9 is an enlarged end view of the blade member shown in FIG. 8;

FIG. 10 is a perspective view of a bevel-tipped corrugated spacer member incorporating the principals of the instant invention;

FIG. 11 is a top plan view of the bevel-tipped corrugated spacer member shown in FIG. 10;

FIG. 12 is a side elevational view of the bevel-tipped corrugated spacer member shown in FIG. 11;

FIG. 13 is an end view of the bevel-tipped corrugated spacer member;

FIG. 14 is a cross-sectional view of the bevel-tipped corrugated spacer member taken along lines 14-14 in FIG. 12;

FIG. 17 is a side elevational view of the square-tipped corrugated spacer member shown in FIG. 16;

FIG. 18 is an end view of the square-tipped corrugated spacer member shown in FIG. 17;

FIG. 19 is a cross-sectional view of the square-tipped corrugated spacer member taken along lines 19-19 in FIG. 17;

FIG. 23 is an end elevational view of the thermoformed sheet of components depicted in FIG. 21;

FIG. 24 is an end elevational view of the thermoformed sheet of components showing the location of the slitter knives to separate the blade members from the bevel-tipped corrugated spacer member and the square tipped corrugated spacer member in the side slitter station; and FIG. 25 is an end elevational view of the components after passing through the side slitter station; and FIG. 26 is a partial enlarged detail view of a joint between two corrugated spacer members with a blade member interposed between the spacer members, the mechanical fastener button being shown in phantom before being crushed to join the members together.

DETAILED DESCRIPTION OF THE PREFERRED EMBODIMENT

Figure 1:
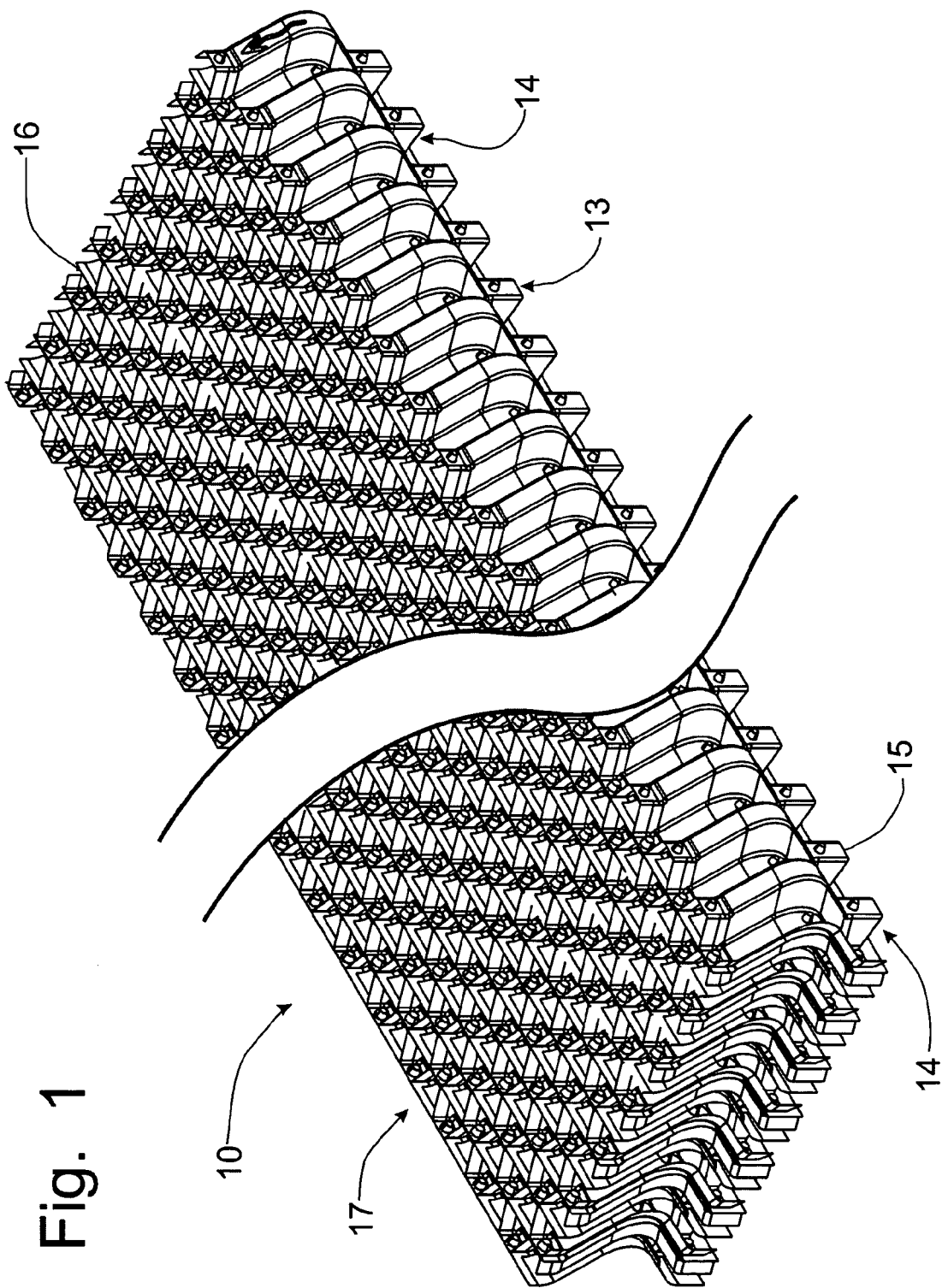
FIG. 1 is a perspective view of a drift eliminator assembly incorporating the principles of the instant invention.
Figure 2:
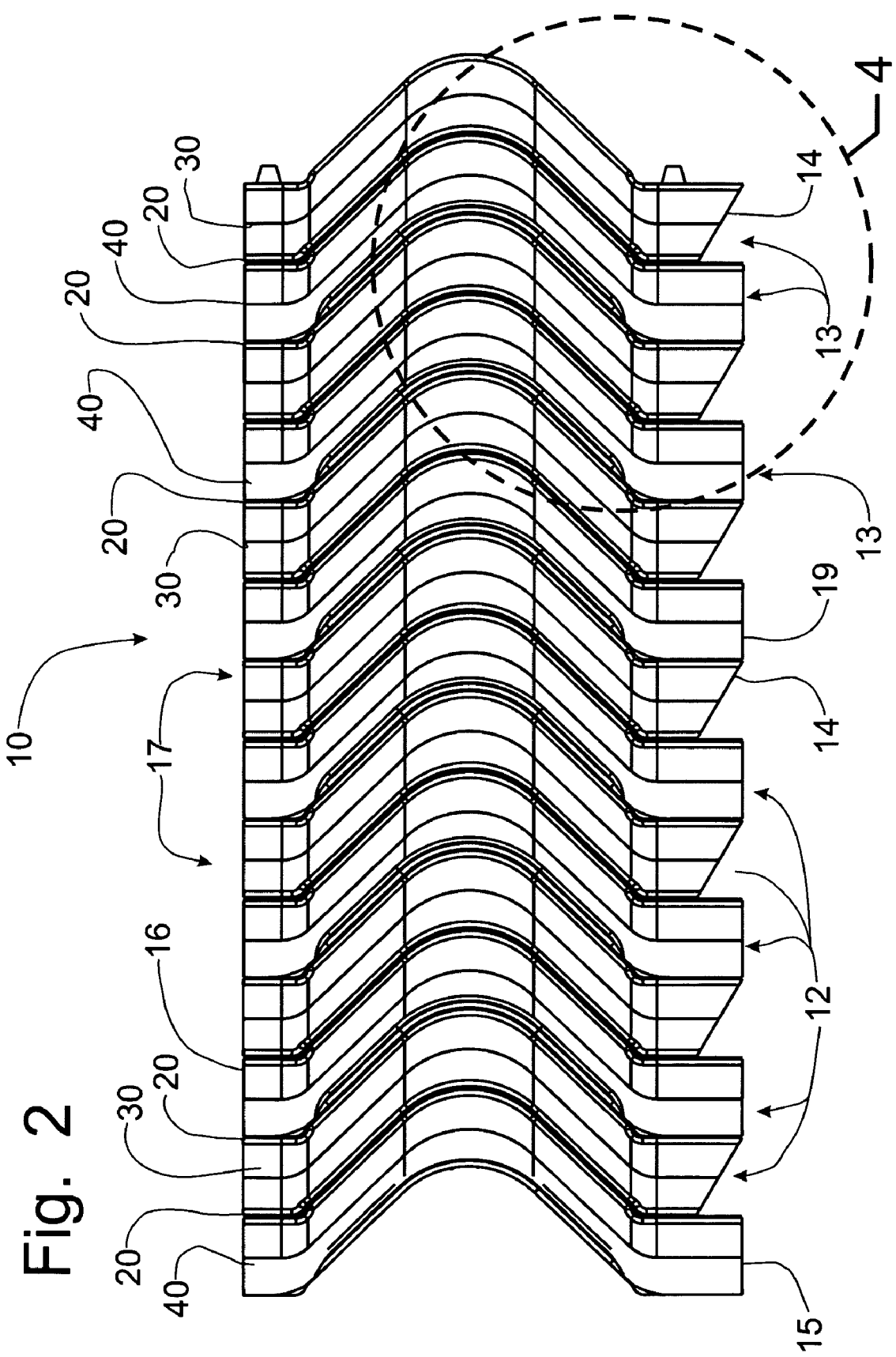
FIG. 2 is a side elevational view of the drift eliminator assembly shown in FIG. 1.
Figure 3:
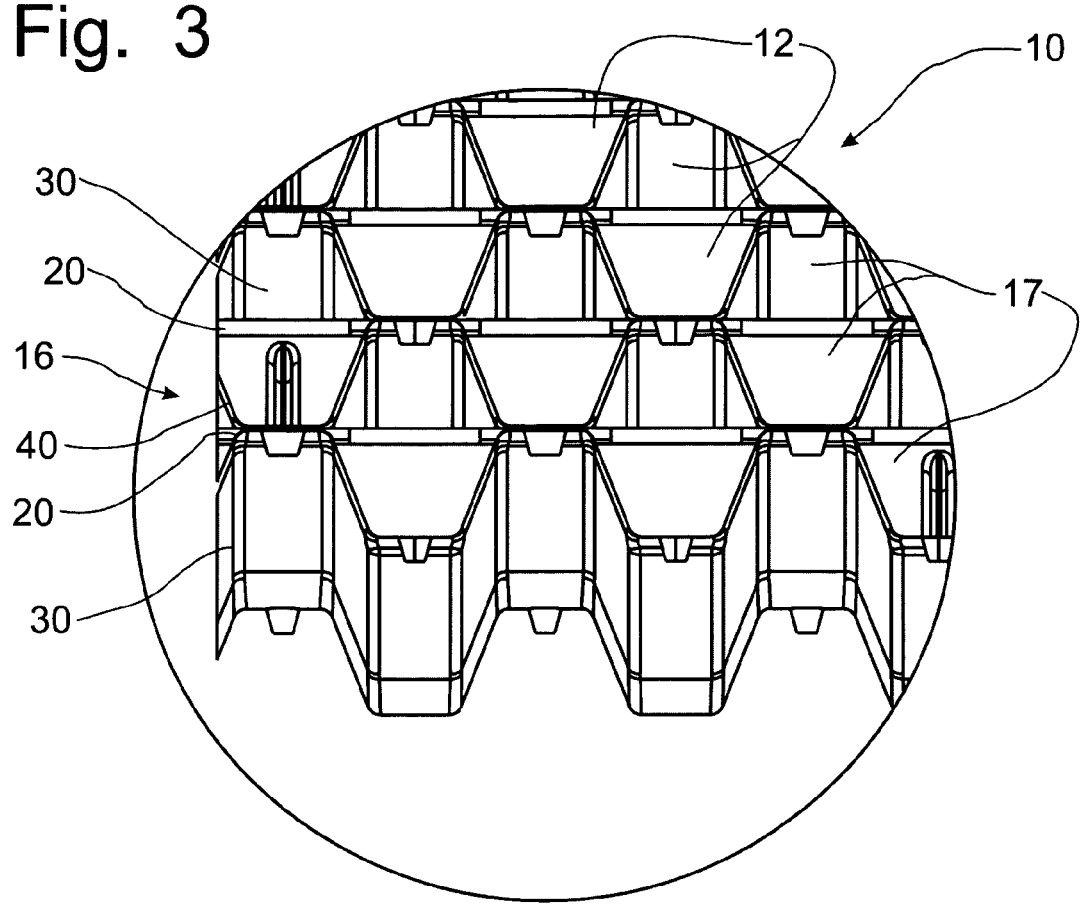
FIG. 3 is an enlarged detail view of a portion of the top of the drift eliminator assembly corresponding to the left front corner of the drift assembly depicted in FIG. 1.
Figure 20:
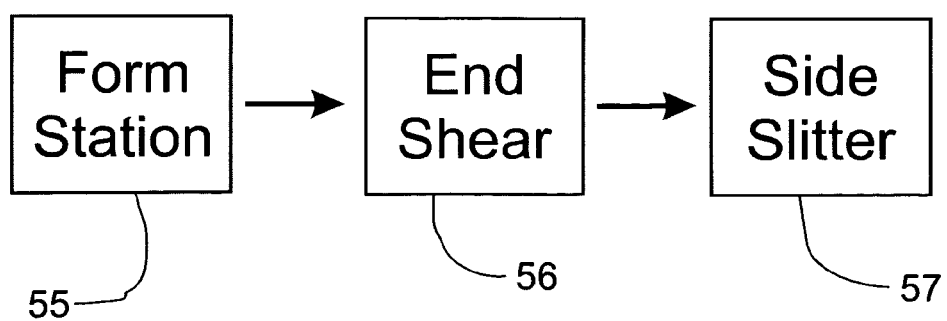
FIG. 20 is a diagrammatic view of the manufacturing process for creating the corrugated spacer members and the blade members.

Referring first to FIGS. 1-5A, a drift eliminator assembly incorporating the principles of the instant invention can best be seen. The drift eliminator assembly 10 is formed of alternating blade members 20 and corrugated spacer members 30, 40 to define an array of cellular tube-like passageways 12 that pass through the assembly 10 from a lower surface 15 to an upper surface 16. As will be described in greater detail below, each of the cellular passageways 12 follows a curved route in traveling from the inlet openings 13 at the lower surface 15 to the discharge openings 17 at the upper surface 16. By forcing the flow of air through the drift eliminator assembly 10, water droplets entrained in the air will impinge on the curved walls of the passageways 12 and flow by gravity to the inlet openings 13 where the collected water droplets will return to the evaporative cooling apparatus (not shown) for recirculation.

Figure 5A:
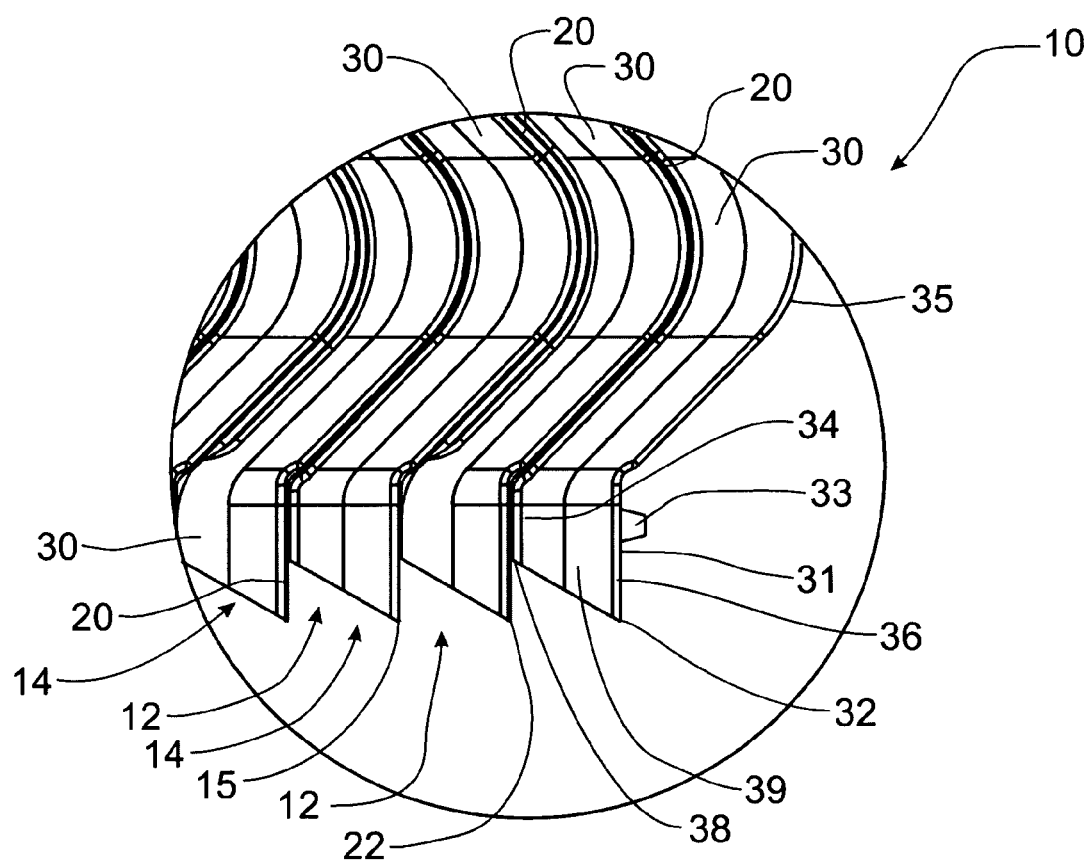
FIG. 5A is an enlarged detail view of a portion of the side of the drift eliminator assembly corresponding to circle 4 of FIG. 2 to show a third embodiment of the beveled tip for the lower surface of the drift eliminator assembly.

As is depicted in FIGS. 4, 5 and 5A, the inlet openings 13 are formed with a beveled tip 14 that extends at an angle to the plane 19 defined by the aligned lower edges 22 of the blade members 20, which corresponds to the lower surface 15 of the drift eliminator assembly 10. The configuration of the drift eliminator assembly 10 shown in FIG. 4 alternates bevel-tipped spacer members 30 and square-tipped corrugated spacer members 40 with blade members 20 interposed between the spacer members 30, 40. The configuration of the drift eliminator 10 shown in FIG. 5 alternates two bevel-tipped corrugated spacer members 30, 50 with blade members 20 interposed between the spacer members. As is noted below, the alternate bevel-tipped spacer member 50 has a supplemental bevel to the first spacer member 30 so that the shortened portions can be connected together back to back as well as the longer portions. The third embodiment shown in FIG. 5A replaces the square-tipped corrugated spacer members 40 with a bevel-tipped corrugated spacer members 30 in the same alignment as the first embodiment with the bevel-tipped spacer members 30 being front-to-back, instead of back-to-back as in the second embodiment shown in FIG. 5.

The individual component members forming the drift eliminator assembly are best seen in FIGS. 6-17. The respective members are preferably thermoformed through a vacuum forming apparatus, which is generally known in the art, from a polymeric film, as will be described in greater detail below. The polymeric film is preferably constructed of polyvinylchloride (PVC), but is not limited to this material. The thickness of each individual member is preferably about 18 mils. The length and width of the component members can be varied according to the desired size of the finished drift eliminator assembly 10, but will preferably have a width of approximately five and a quarter inches. The overall length is typically six to eight feet, but is dependent on the size of the evaporative cooling apparatus into which the drift eliminator assembly 10 is to be placed.

The blade member 20 is best seen in FIGS. 6-9. The blade member 20 is not symmetrical as the lower edge 22 extends further from the curved portion 25 than the upper edge 26, so that the bevel-tipped and square-tipped spacer members 30, 40 can both be fastened to the blade member 20. Accordingly, extending from the lower edge 22, the blade member has a lower linear portion 21 connected to a curved portion 25 that is connected to the upper linear portion 26 terminating in the upper edge 27. The lower linear portion 21 is longer than the upper linear portion 26. Both the lower and upper linear portions 21, 26 are formed with fastener buttons 23, 29 to provide the function of mechanically fastening the members together, as will be described in greater detail below. The position of the respective fastener buttons 23, 29 relative to the curved portion 25 is substantially the same. The lower linear portion, however, has a greater length from the fastener button 23 to the lower edge 22 than the fastener button 29 relative to the upper edge 27.

The corrugated spacer members 30, 40 are formed to define in conjunction with the interposed blade members 20 the passageways 12 through which the moisture laden air flows. As best seen in FIGS. 10-13, the bevel-tipped spacer member 30 is formed with a lower linear portion 31 formed with a fastener button 33 formed integrally with a curved portion 35 configured to mate with the curved portion 25 of the blade members 20 and then an upper linear portion 34, which is also formed with a fastener button 33a. The corrugations in the spacer member 30 create the passageways 12 when closed against the blade members 20. Each corrugation has a forward facing wall with the raised corrugation having a front forward facing wall 36 and the recessed corrugation having a rear forward facing wall 37. The front wall 36 and the rear wall 37 are interconnected by transversely opposed side walls 39.

At the lower linear portion 31, the front wall 36 defines the lower edge 32, which is intended to align with the lower edge 22 of the blade member 20 when affixed thereto, as will be described in greater detail below. The side walls 39 are formed during the manufacturing process to angle rearwardly to the rear wall 37 so that the rear wall 37 terminates at an elevated edge 38. When properly affixed to a blade member 20, the elevated edge 38 is spaced vertically from the lower edge 32 defined by the front wall 36. Accordingly, the side walls extend at an angle, preferably at about 30 degrees to the plane established by the lower surface 15 of the drift eliminator assembly 10. With this configuration defining a beveled lower tip at the inlet openings 13 corresponding to the spacer member 30, a film of water will not form in a manner that will block the flow of air through the corresponding passageway 12.

The upper linear portion 34 has no need for a beveled tip as the water droplets precipitating from the air flow through the passageways 12 will flow downwardly toward the inlet opening 13. Accordingly, the front wall 36 and the rear wall 37 are squared off during the formation of the spacer member 30, as will be described in greater detail below, so that both the front wall 36 and the rear wall 37 lie in a common plane defining the upper surface 16 of the drift eliminator assembly 10.

The fastener buttons 33 on the lower linear portion 31 of the spacer member 30 are positioned on both the front walls 36 and the rear walls 37 so as to be engagable with the corresponding fastener buttons on the lower linear portion 21 of the blade member 20. Accordingly, the fastener buttons 33 on the lower linear portion 31 are spaced a greater distance from the lower edge 32 than is found for the upper fastener button 33a on the upper linear portion 34. This increased distance from the fastener button 33 to the lower edge 32 enables the fastener button 33 on the rear wall 37 to be located at approximately the same distance from the elevated edge 39 as is found with respect to the upper fastener button 33a and the upper surface 16. Furthermore, this configuration places the lower edge 32 of the spacer member 30 in alignment with the lower edge 22 of the blade member 20 to provide enhanced strength at the lower surface 15 of the drift eliminator assembly 10.

The other spacer member 40, 50 can be in either configuration described below. In the embodiment shown in FIG. 4, the spacer member alternating with the bevel-tipped spacer member 30 is a square-tipped spacer member 40. The use of an alternating square-tipped spacer member 40 is a concession to manufacturing difficulties of forming a second bevel-tipped spacer member 50. Tests have shown that adequate performance, measured in terms of the horsepower requirements to push air through the drift eliminator assembly, can be obtained by using a bevel-tipped spacer member 30 alternating with a square-tipped spacer member 40. Performance would be enhanced slightly by using a reverse bevel-tipped spacer member 50, as will be described below.

Figure 15:
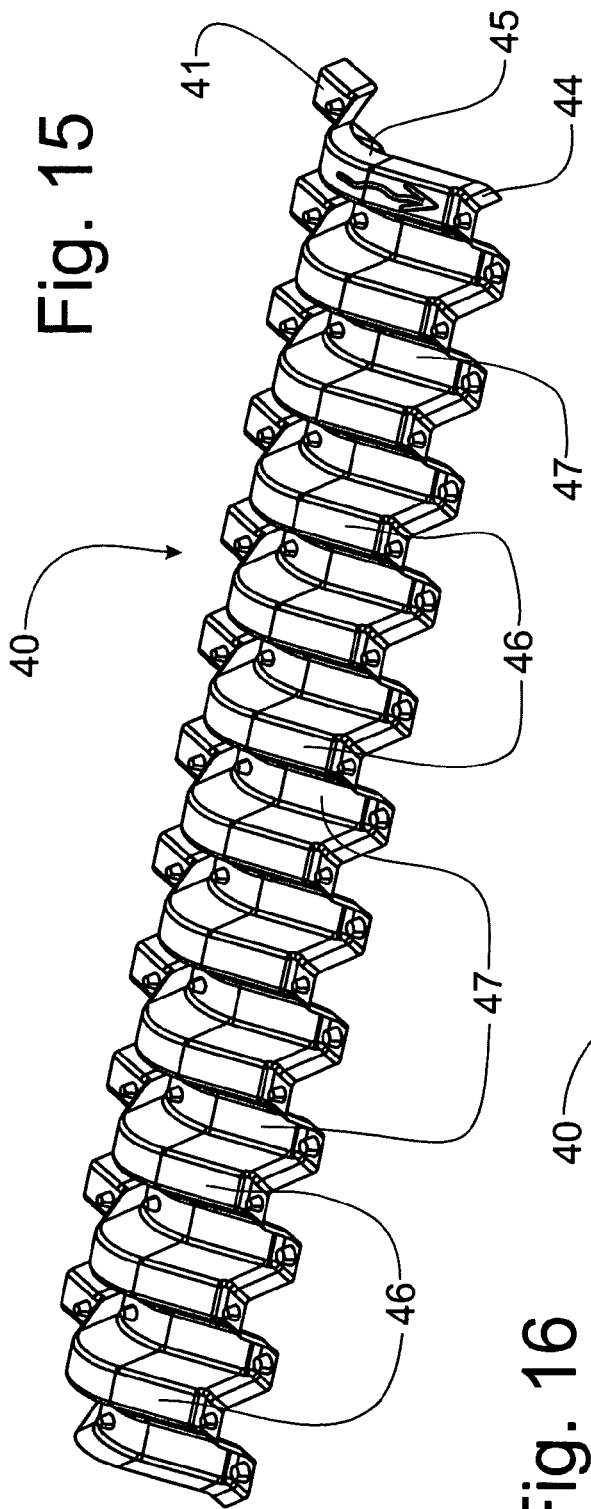
FIG. 15 is a perspective view of a square-tipped corrugated spacer member incorporating the principals of the instant invention.
Figure 16:
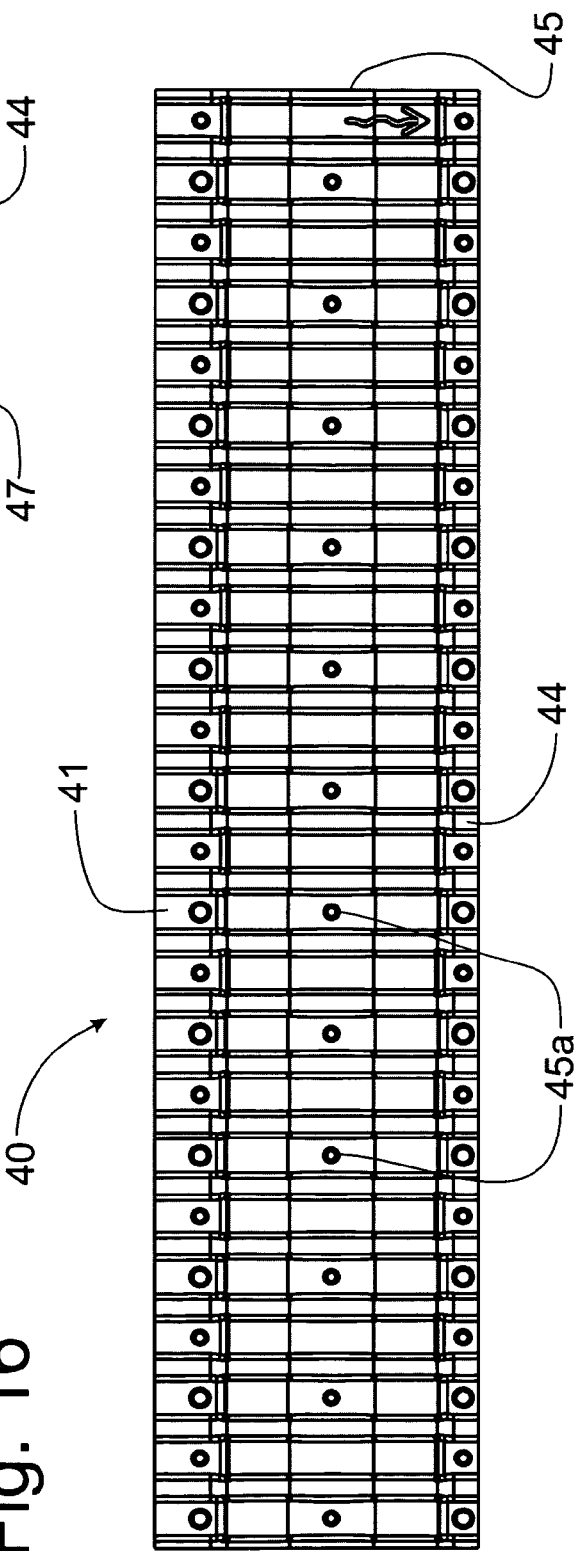
FIG. 16 is a top plan view of the square-tipped corrugated spacer member shown in FIG. 15.

As best seen in FIGS. 15-17, the square-tipped spacer member 40 is formed in substantially the same configuration as the bevel-tipped spacer member 30, except for the formation of the angled side walls 39. The lower linear portion 41 has fastener buttons 43 positioned identically on both the front wall 46 and the rear wall 47 as is found on the front wall of the bevel-tipped spacer member 30. The lower linear portion 41 is integrally formed with the curved portion 45, which is configured to mate with the curved portion 25 of the blade member 20, and the upper linear portion 44. In the square-tipped spacer member 40, the front wall 46 and the rear wall 47 terminate in the same plane when mounted to blade members 20 as part of the drift eliminator assembly 10.

The embodiment shown in FIG. 5, the spacer member 50 alternating with the bevel-tipped spacer member 30 is a reverse bevel-tipped spacer member 50. The configuration of the spacer member 50 is substantially identical to the spacer member 30, except for the orientation of the angled side walls 53. The side walls 53 are angled so that the terminus of the rear wall is the lower edge 52 that is in the same plane as the lower edge 22 of the blade member 20 and the lower edge 32 of the bevel-tipped spacer member 30, when properly affixed to the blade member 20. The angle of the side walls 53 positions the terminus of the front wall at an elevated edge 51 that corresponds to the elevated edge 38 on the bevel-tipped spacer member 30.

When properly mounted to blade members 20, the lower edge 52 of the spacer member 50 is positioned against the lower edge 22 of the adjacent blade member 20, which is also positioned next to the lower edge 32 of the spacer member 30 located on the opposing side of the blade member 20 from the spacer member 50. All three lower edges 22, 32, 52 terminate in the same horizontal plane and provide a support structure that is three material thicknesses in width. Furthermore, the elevated edge 51 of the same spacer member 50 is affixed to a second blade member 20 which has on the opposing side thereof a second bevel-tipped spacer member 30 whose elevated edge 38 is in register with the elevated edge 51.

Figure 21:
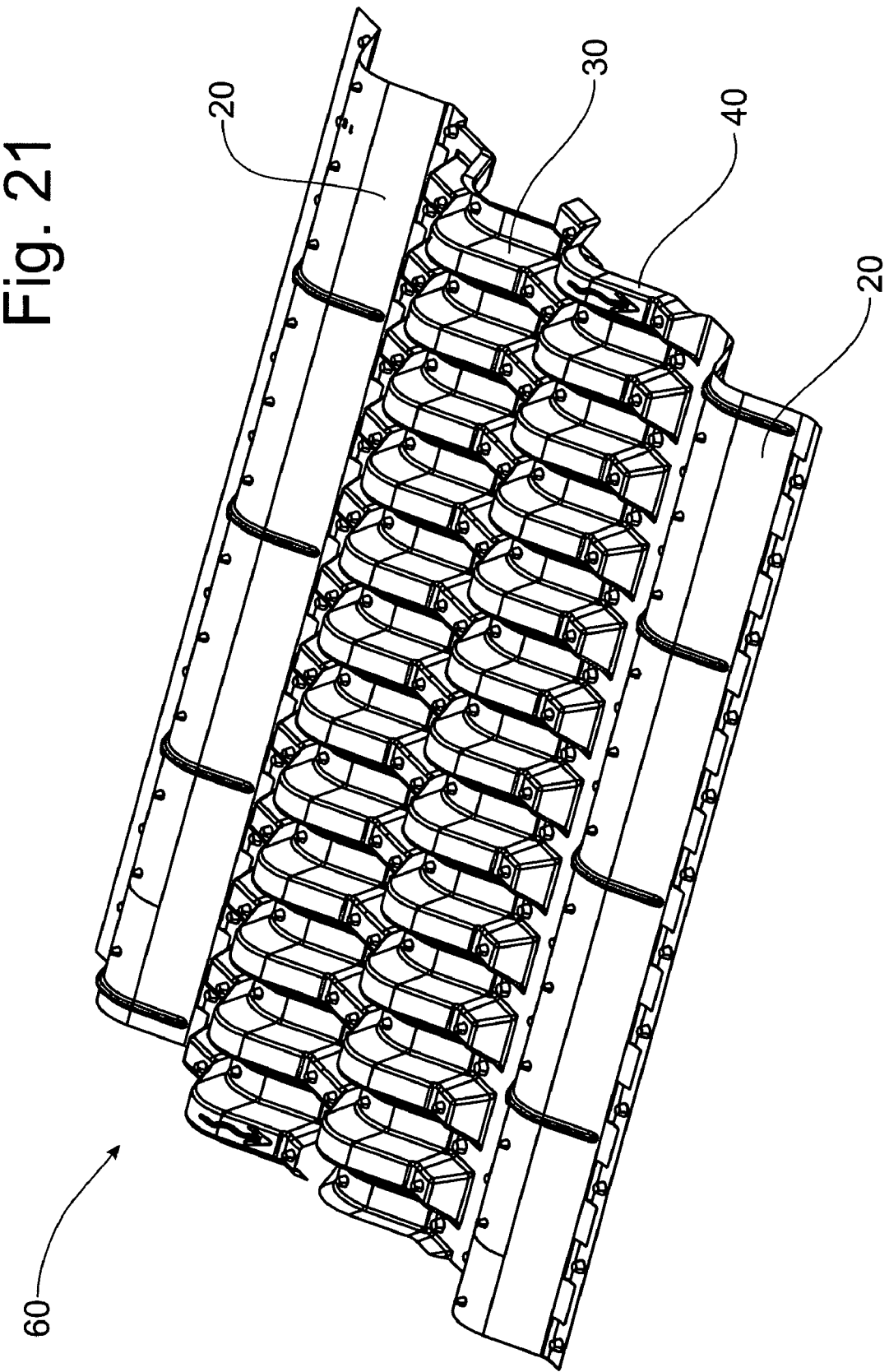
FIG. 21 is a perspective view of the thermoformed sheet containing the components of the drift eliminator assembly prior to entering the side slitter station.
Figure 22:
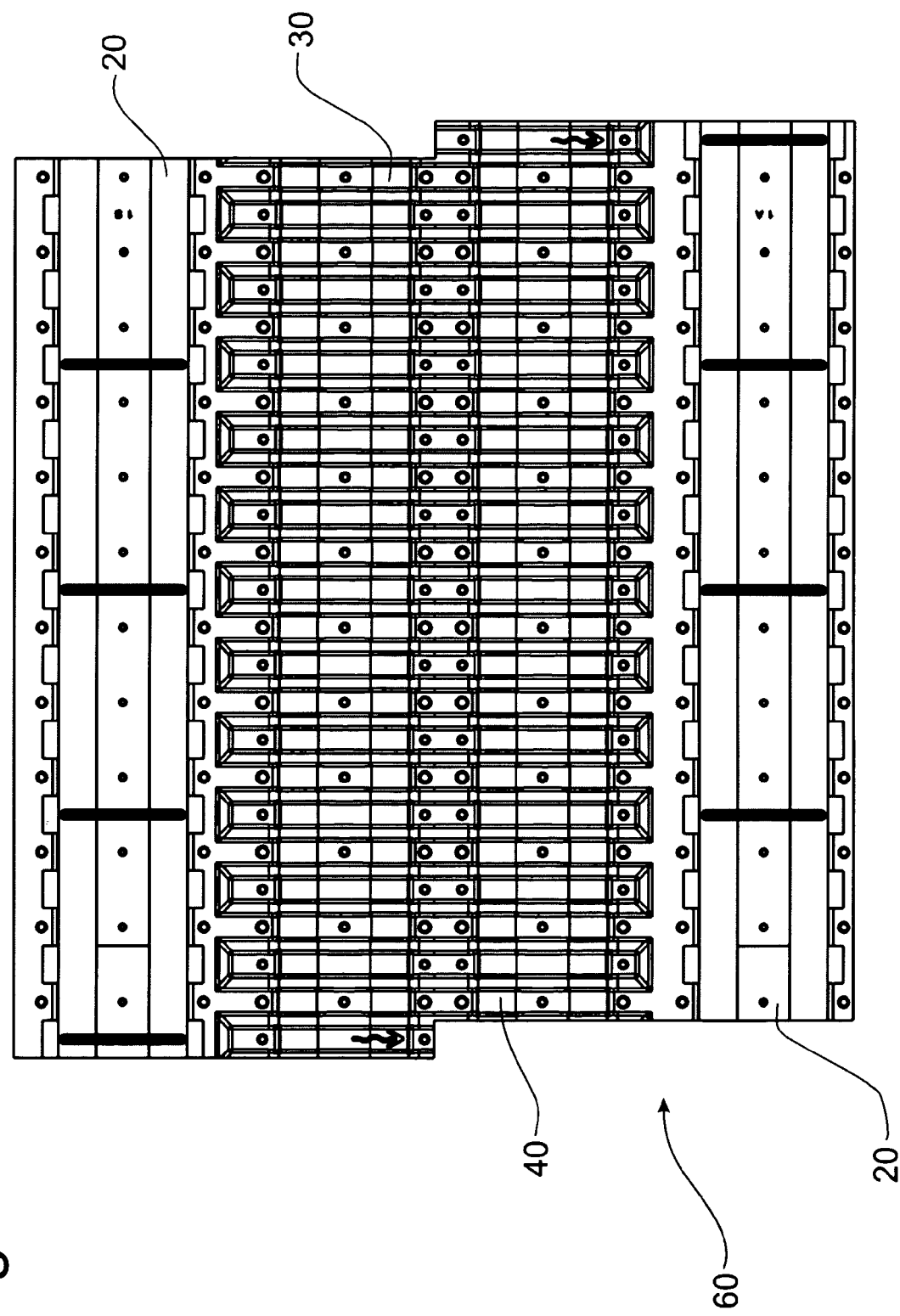
FIG. 22 is a top plan view of the thermoformed sheet of components as depicted in FIG. 21.

Referring now to FIGS. 18-22, the manufacturing process to produce the individual components 20, 30, 40 can best be seen. The manufacturing process begins with a conventional forming station 55 that includes a mold that vacuum forms the heated polymer material into the shape defined by the mold. Preferably, the polymer material is fed into the mold in a continuous manner so that the product is formed in sequential sections. Once the polymer material has been molded into a formed product sheet (not shown), the product sheet is moved to an end shear station 56 where the continuous product sheet is cut transversely into discrete product panels 60 having a desired length. As can be seen in FIG. 21, the transverse cut made to the continuous product sheet to form the product panel 60 is a staggered cut with the offset corresponding to the subsequent cut to separate the two spacer panels 30, 40.

The product panel 60 is then taken to the side slitter station 57 where longitudinal cuts are made to the product panel 60 to separate the component parts 20, 30, 40 from the scrap material 61 between the two blade members 20 and the respective spacer members 30, 40. One skilled in the art will recognize that the product panel 60 will also have opposing side scrap pieces (not shown) corresponding to the feeding apparatus at the forming station 55, end shear station 56 and the side slitter station 57. These side scrap pieces are not shown in the drawings for purposes of clarity. As is best seen in FIG. 24, the side slitter station 57 uses vertical knives 58 to make the vertical longitudinal cuts separating the first blade member 20 from the square-tipped spacer member 40; between the two spacer members 30, 40 to separate the two spacer members without creating scrap material; and to separate the second blade member 20 from the bevel-tipped spacer member 30. In addition, an angled knife 59 is used to make the angled cut on the side walls 39. One skilled in the art will also note that the vertical knife 58a at the center of the product panel 60 to separate the two spacer members 30,40 is slightly off center so that the longer lower linear portion 41 is formed on one side of the knife 58a and the shorter upper linear portion 34 is created on the other side of the knife 58a.

One skilled in the art will recognize that a second angled knife 59a, schematically depicted in phantom lines in FIG. 24, in conjunction with the central vertical knife 58a to form the reverse bevel-tipped spacer member 50, instead of the square-tipped spacer member 40. While other orientations of the respective components 20, 30, 50 on the product panel 60 could be utilized to make the use of the second angled knife 59a more convenient, the orientation of the components of the product panel 60 as shown in FIG. 24 is preferred as the assembly of the separated components, whether the square-tipped spacer member 40 or the reverse bevel-tipped spacer member 50 is formed, are oriented for mechanical assembly without requiring a re-orientation of any of the separated components. Referring to FIG. 25, one skilled in the art will recognize that the respective lower linear portions 21, 31, 41 are all oriented in a manner that the components can be engaged, whether manually or by machine, and stacked without requiring any of the components to be re-oriented.

Once the component members 20, 30, 40 have been separated at the side slitter station 57, the component members 20, 30, 40 are then assembled into the drift eliminator assembly 10, as depicted in FIGS. 1-5. The assembly can be automated or done manually. The spacer members 30, 40 are oriented with a blade member between them, as is represented in FIG. 26, where the fastener buttons 23, 33, 43 are stacked and nested together and then crushed to merge the fastener buttons and secure the three components together. This fastening process is repeated for each set of nested fastener buttons along both the upper and lower portions of the components. One skilled in the art will note that the curved portions of the blade members 20 and the spacer members 30, 40 are also formed with fastener buttons 25a, 35a, 45a that are arranged to nest when assembled properly. These fastener buttons 25a, 35a, 45a on the curved portions 25, 35, 45 are not crushed, however, but are utilized to prevent shifting of one curved portion relative to the other curved portion due to the interengagement of the fastener buttons 25a, 35a, 45a.

It will be understood that changes in the details, materials, steps and arrangements of parts which have been described and illustrated to explain the nature of the invention will occur to and may be made by those skilled in the art upon a reading of this disclosure within the principles and scope of the invention. The foregoing description illustrates the preferred embodiment of the invention; however, concepts, as based upon the description, may be employed in other embodiments without departing from the scope of the invention.

What is claimed is:

1. A drift eliminator comprising:
   a plurality of first corrugated spacer members, each said first spacer member having a first configuration;
   a plurality of second corrugated spacer members, each said second spacer member having a second configuration, said first and second spacer members being stacked in an alternating relationship; and
   a blade member interposed between each of said first and second spacer members to define passageways through said drift eliminator from a lower inlet opening to an upper discharge opening.

2. The drift eliminator of claim 1 wherein each said first spacer member has a beveled tip at said inlet opening.

3. The drift eliminator of claim 2 wherein each said first spacer member includes a front wall and a rear wall, which are interconnected by side walls, said front wall terminating in a lower edge and said rear wall terminating is an elevated edge, said elevated edge being located vertically above said lower edge when said drift eliminator is disposed in an operative orientation.

4. The drift eliminator of claim 3 wherein each said side wall extends linearly from a corresponding said lower edge to a corresponding said elevated edge.

5. The drift eliminator of claim 4 wherein each said blade member terminates in a lower edge, said lower edges of said first spacer members being in a common plane with said lower edges of said blade members.

6. The drift eliminator of claim 5 wherein each said second spacer member includes a front wall, a rear wall and side walls interconnecting respective said front and rear walls, said front and rear walls terminating in lower edges that are substantially co-planar with said lower edges of said blade members and said first spacer members.

7. The drift eliminator of claim 5 wherein each said second spacer member includes a front wall, a rear wall and side walls interconnecting respective said front and rear walls, said rear wall of each said second spacer member terminating in a lower edge, said front wall of each said second spacer member terminating in an elevated edge, such that each said second spacer member is also formed with a beveled tip.

8. The drift eliminator of claim 7 wherein each said second spacer member is affixed to a first blade member on one side thereof such that said elevated edge of the second spacer member is located directly adjacent to said elevated edge of the corresponding first spacer member with said first blade member being interposed between said first and second spacer members, said second spacer member also being affixed to a second blade member on an opposing side of said second spacer member such that said lower edge is positioned directly adjacent to said lower edge of another first spacer member with said second blade member being disposed therebetween.

9. The drift eliminator of claim 5 wherein said blade members, said first spacer members and said second spacer members are asymmetric about a central horizontal axis, each of said blade members, said first spacer members and said second spacer members being formed with a lower linear portion, a central curved portion and an upper linear portion, said lower linear portion and said upper linear portion having unequal lengths.

10. The drift eliminator of claim 9 wherein said lower linear portion has a greater length than said upper linear portion to accommodate the vertical separation of said lower edge and said elevated edge.

11. The drift eliminator of claim 10 wherein said front wall of each said first spacer members have a first fastener button located at a first distance from said lower edge, said rear wall having a second fastener button located at a second distance from said elevated edge, said first distance being greater than said second distance, said first and second fastener buttons being engagable with a corresponding fastener button formed on said lower linear portion of said blade member.

12. In a drift eliminator formed of alternating blade members and corrugated spacer members defining passageways through said drift eliminator, each said passageway having a lower inlet opening and an upper discharge opening for the passage of air through said passageways from said inlet openings to said outlet openings, the improvement comprising:
    at least a portion of said spacer members being a first spacer member formed with a beveled tip at said lower inlet opening, said first spacer member including a front wall and a rear wall, which are interconnected by side walls, said beveled tip being defined by a beveled edge extending linearly from said front wall to said rear wall to define an elevated edge and a lower edge when said drift eliminator is disposed in an operative orientation.

13. The drift eliminator of claim 12 wherein said front wall terminates in said lower edge, said rear wall terminating in said elevated edge spaced above said lower edge of said front wall, said beveled edge extending linearly from said lower edge to said upper edge to define said beveled tip at each said inlet opening.

14. The drift eliminator of claim 13 wherein said spacer members further include second spacer members alternating with said first spacer members, said first and second spacer members having different configurations.

15. The drift eliminator of claim 14 wherein said blade members, said first spacer members and said second spacer members are asymmetrical, each of said blade members, said first spacer members and said second spacer members being formed with a lower linear portion, a central curved portion and an upper linear portion, said lower linear portion and said upper linear portion having unequal lengths.

16. The drift eliminator of claim 15 wherein said lower linear portion has a greater length than said upper linear portion to accommodate the vertical separation of said lower edges and said elevated edges.

* * * * *